United States Patent [19]

Keck et al.

[11] Patent Number: 5,271,676
[45] Date of Patent: Dec. 21, 1993

[54] COMBINATION PACKAGE TILT PAD JOURNAL BEARING/DUAL SELF EQUALIZING THRUST BEARINGS, WITH HYDROSTATIC LIFT PROVISIONS

[75] Inventors: Richard K. Keck, Clifton Park; Blake Wilson; Steve Hendricks, both of Schenectady, all of N.Y.; Thomas R. Byrne, Grafton, Wis.

[73] Assignee: General Electric Company, Schenectady, N.Y.

[21] Appl. No.: 922,533

[22] Filed: Jul. 30, 1992

[51] Int. Cl.$^5$ ............................................. F16C 17/10
[52] U.S. Cl. ...................................... 384/111; 384/117; 384/119; 384/122; 384/144; 384/307
[58] Field of Search ................ 384/111, 119, 124, 117, 384/122, 118, 144, 368, 307, 311

[56] References Cited

U.S. PATENT DOCUMENTS

| | | | |
|---|---|---|---|
| 3,893,737 | 7/1975 | Tyson | 384/307 |
| 4,348,067 | 9/1982 | Tooley | 384/144 |
| 4,501,505 | 2/1985 | Chambers | 384/307 |
| 4,652,148 | 3/1987 | Olasz | 384/122 |

*Primary Examiner*—Lenard A. Footland
*Attorney, Agent, or Firm*—Nixon & Vanderhye

[57] ABSTRACT

The bearing pedestal for the rotating shaft 12 includes journal and axial thrust bearings 16 and 26, respectively. Both of the journal and thrust bearings have passages 70 and 80, respectively, and recesses 74 and 82 in the respective pad faces for flowing high pressure lubricant between the pads and the shaft to displace the shaft and pads relative to one another to minimize the required breakaway torque and metal-to-metal contact. Each thrust bearing includes a plurality of circumferentially spaced pads 26 and lubricant directors 30 between the pads. The lubricant director includes a rib 34 extending generally tangentially and radially outwardly to channel lubricant from a preceding pad to a succeeding pad in the direction of shaft rotation and to channel the lubricant for flow tangentially from the thrust bearing into an annular cavity 39 for return to sump 42. An end seal assembly 40 includes an element 44 having internal and external labyrinth seals 54 and 55 straddling an annular groove 50 opening onto the shaft. An annular recess 48 is provided along the inner surface of element 44 to receive lubricant splashed from the tangential flow and direct it into the cavity. Drain back openings 56 and 59 flow lubricant from the labyrinth seals into the cavity 39.

20 Claims, 5 Drawing Sheets

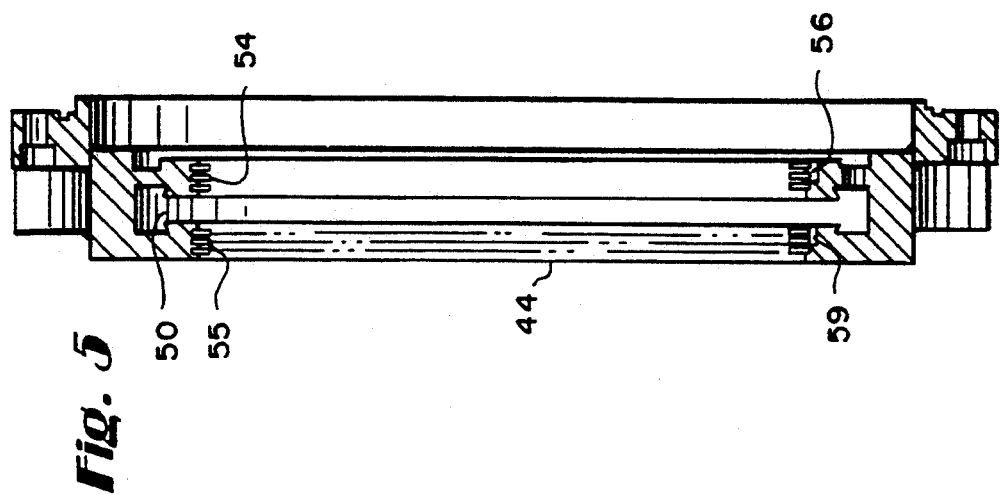
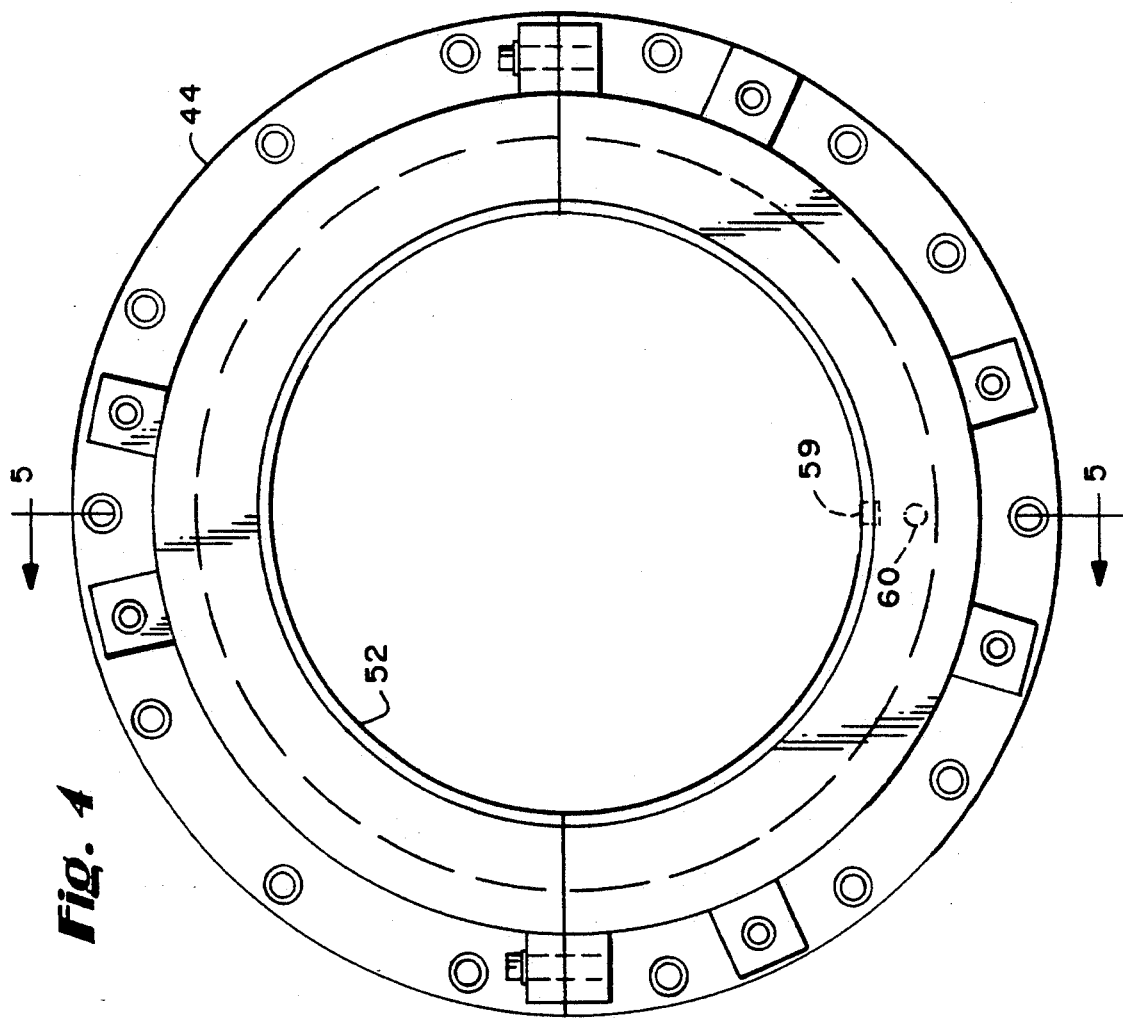

COMBINATION PACKAGE TILT PAD JOURNAL BEARING/DUAL SELF EQUALIZING THRUST BEARINGS, WITH HYDROSTATIC LIFT PROVISIONS

TECHNICAL FIELD

The present invention relates to a bearing assembly for a rotatable shaft and particularly relates to a compact bearing pedestal for generator turbine shafts, the pedestal bearing having tilt pad journal and self-aligning thrust bearings with hydrostatic and hydrodynamic operating characteristics, as well as end leakage seal assemblies to preclude lubricant leakage.

BACKGROUND

In prior journal and thrust bearing designs for generator turbine shafts, the bearings have required substantial quantities of lubricant and contributed to horsepower losses. For example, many bearing designs utilize the lubricant discharged from the journal bearings as the lubricant for flooding the thrust bearings. The flooding of the thrust bearings results in more lubricant flow, high lubricant leakage through conventional end seal assemblies, such as bronze contact seals, and consequent high horsepower losses. Many other designs require a separate pressurized lubricant inlet for the thrust bearings which again requires substantial lubricant flow, introduces a complexity of plumbing and results in additional lubricant leakage. Moreover, standard pedestal bearing packages conventionally operate for only one direction of rotation of the shaft. Thus they cannot accommodate shafts which rotate opposite to the designed rotational direction. Bearing designs must therefore be particularly constructed for shaft rotation in one direction or the other and not both.

Further, in the standard pedestal bearing design, lubricant is typically channeled to a sump before it comes into contact with end deflector seals. This disadvantageously requires substantial additional space and precludes a generally compact bearing design.

DISCLOSURE OF INVENTION

In accordance with the present invention, there is provided a combination journal/thrust pedestal bearing for a shaft, e.g., a generator shaft, the shaft having a diametrically reduced portion with opposed annular bearing faces. The bearing includes a plurality of journal pads mounted for pivotal movement on axes normal to one another, i.e., axes parallel to the axis of the shaft and axes normal thereto. Each pad is preloaded such that its diameter is larger than the assembled diameter of the bearing. Forming part of the pedestal bearing are two self-equalizing thrust bearings on opposite sides of the journal bearing for bearing against the annular shaft bearing faces, respectively. Preferably, each thrust bearing includes a plurality of circumferentially spaced pads, e.g., four pads, with two rows of pivoting links below the pads enabling the load applied to the thrust bearing to be equally distributed to each of the pads. A lubricant director is positioned between each of the pads to channel the lubricant to a succeeding bearing pad (in the direction of shaft rotation) and from a preceding bearing pad (in the direction of shaft rotation) to an oil sump. Thus, the lubricant directors serve to control and direct the lubricant to the lubricating surfaces and away from those surfaces without employing a lubricant-flooded cavity.

It is also essential to minimize the breakaway torque required to initially rotate the shaft and to minimize any rubbing or metal-to-metal contact that would otherwise occur during low speed or start operations. To accomplish this, each thrust pad and the two lower journal pads have hydrostatic lift features. Particularly, each such pad has a recess in its face and which recess is supplied with high pressure lubricant to displace the shaft relative to the pads. Thus, high pressure lubricant supplied to the journal pads lifts the shaft to enable the lubricant to be disposed between the shaft and pad bearing surface at start-up and low speed operation. Similarly, high pressure lubricant supplied to the thrust bearing pads at start-up or low speed operation displaces the shaft axially from the loaded thrust face to enable lubricant to be disposed in the gaps between the thrust bearing pad surfaces and the annular shaft bearing faces. Check valves are provided in the lubricant lines feeding the recesses in the bearing pad surfaces to prevent reverse flow of lubricant during hydrodynamic operation.

Lubricant flow into the bearing assembly during hydrodynamic operation is controlled at an inlet to the journal bearing volume by a number of orifices which meter the lubricant into the volume. The journal bearing surfaces are thus lubricated by supplying lubricant into the journal bearing volume for flow between the shaft and the journal bearing pad surfaces. This flow migrates axially along the shaft in opposite directions and along the inside diameters of the thrust bearing retainers until it reaches the inside diameter of the thrust pad faces and the shaft bearing faces. In accordance with the present invention, lubricant director pads are disposed between the circumferentially spaced thrust pads. Each lubricant director pad includes an end face having an axially projecting rib which extends in a generally tangential direction relative to the shaft from one end of the director pad at a radially innermost position to a radially outermost position adjacent the opposite end of the pad. Consequently, the rib of each lubricant director pad channels lubricant from adjacent the shaft to the leading edge of the next-adjacent thrust pad (the succeeding thrust pad in the direction of shaft rotation) to supply lubricant between it and the shaft bearing face. The rib also channels the lubricant received from the preceding thrust bearing pad (in the direction of shaft rotation) generally tangentially out of the bearing assembly into an annular cavity surrounding the thrust bearing. By using the lubricant in this directed and controlled manner, a reduced quantity of lubricant than would otherwise be necessary is used. Additionally, because this controlled and directed lubricant flow, and the end seal assembly discussed below minimize the quantity of lubricant required, the lube tank, pump, plumbing and other required hardware can be downsized. Auxiliary back-up equipment can also be downsized. Horsepower lost within the bearing, caused by shearing and churning of the lubricant, is also reduced. As a further consequence, less heat is generated inside the bearing pedestal requiring less lubricant flow for removing the heat.

End seal assemblies are employed in conjunction with the thrust bearing lubricant directors to minimize or eliminate end seal leakage. By using thrust bearing lubricant directors to direct the lubricant tangentially into the annular cavity, the lubricant moves away from the shaft, decreasing the amount of lubricant impinging on the shaft at the end seal oil deflector locations. Thus, the oil from the thrust bearing surfaces is removed directly into the cavity and directed to the sump, minimizing the quantity of lubricant directed against the end seal assembly. Each end seal assembly includes a labyrinth end seal lubricant deflector comprising a ring element mounting axially spaced internal and external labyrinth seals along the shaft directly axially adjacent the thrust bearings. The ring element includes along its inner annular face exposed to the cavity an annular recessed gutter which has an angled internal wall or edge for collecting lubricant splashed into the cavity from the tangential flow of lubricant directed by the ribs carried by the thrust bearing pads. Consequently, lubricant splashed along the inner face of the end seal element is carried by the annular gutter to a lower portion of the ring element for direct discharge into the cavity and to the sump. The internal labyrinth seal also includes a series of drain back openings. Thus, lubricant migrating axially along the shaft past the thrust bearings and deflected by the internal labyrinth seal into the drain back openings flows back into the cavity. The ring element also includes an annular lubricant catcher groove opening onto the shaft between the internal and external labyrinth seals for collecting any lubricant leakage migrating along the shaft past the internal labyrinth seal. At the bottom of the catcher groove is an opening into both the annular gutter and the cavity for directing lubricant leakage flow from between the labyrinth seals into the cavity and to the sump. The external labyrinth seal also includes drain back openings for draining any residual lubricant on the shaft migrating past the internal labyrinth seal and the catcher groove back into the lubricant catcher groove for flow into the cavity and sump.

Consequently, the unique bearing design hereof provides a combination of double-tilt journal bearings and dual self-equalizing thrust bearings, all having hydrostatic lift provisions in a compact pedestal end bearing design. The bearing design permits the journal bearing to be flooded with lubricant, yet enables controlled and directed lubrication of the thrust bearings without flooding the thrust bearing. This facilitates elimination of leakage through the end seal assemblies. That is, the thrust bearing lubricant directors enable the labyrinth end seal lubricant deflectors to be located directly outboard of the thrust faces without the typical concerns of lubricant leakage out of the pedestal assembly and enables the pedestal bearing assembly to be maintained at a minimum axial length. A comparable pedestal bearing generally would have an axial length 50% greater than the present pedestal package. A further feature resides in the use of thrust bearing lubricant directors to provide directed lubrication of the thrust bearing pads using lubricant discharged from the journal bearing and tangential flow of lubricant directed radially outwardly of the thrust bearings for return to the sump. This minimizes lubricant flow requirements and decreases the possibility of leakage. The specifically configured lubricant deflectors used in tandem with the thrust face lubricant directors essentially eliminates end seal leakage.

The thrust bearings of the present design are interchangeable between the opposite ends of the bearing to accommodate opposite rotations of the shaft. That is, the pair of end thrust bearings are designed to direct and control the flow of lubricant upon installation for shaft rotation in a predetermined direction. To accommodate shaft rotation in the opposite direction, the same pair of thrust bearings are installed but at the opposite ends of the bearing pedestal, i.e., they are reversed. Thus, one pair of thrust bearings can be installed in a bearing pedestal to accommodate a shaft rotating in either direction.

In a preferred embodiment according to the present invention, there is provided a bearing assembly for a rotatable shaft having annular and cylindrical bearing face, comprising journal and thrust bearings, the thrust bearing including a pad for disposition in opposition to the annular shaft bearing face, means defining a cavity about the thrust bearing and means forming part of the thrust bearing for directing lubricant from adjacent the shaft between the thrust bearing pad and the shaft bearing face into the cavity. An end seal assembly includes an element carrying a labyrinth seal surrounding the shaft at a location spaced axially of the shaft bearing face and on the side thereof remote from the thrust bearing for deflecting lubricant migrating along the shaft past the thrust bearing. The element has a recess for receiving the deflected lubricant from the labyrinth seal, the recess opening into the cavity for flowing the deflected lubricant into the cavity. The element also has a lubricant catcher groove spaced axially from the labyrinth seal on the side thereof remote from the shaft bearing face, the groove opening along the shaft and the element having an opening in communication with the groove and the cavity for flowing into the cavity lubricant leaking along the shaft past the labyrinth seal and into the groove.

In a further preferred embodiment according to the present invention, there is provided an annular bearing assembly for a rotatable shaft having a bearing face, comprising at least one thrust bearing having a plurality of thrust bearing pads spaced circumferentially from one another about the thrust bearing for disposition in axial opposition to the shaft bearing face, means defining a cavity about the thrust bearing and means disposed between adjacent first and second circumferentially spaced thrust bearing pads for directing lubricant flowing between the first thrust bearing pad and the shaft bearing face for flow in a generally tangential direction into the cavity and for directing lubricant from adjacent the shaft between the second thrust bearing pad and the shaft bearing face.

In a still further preferred embodiment according to the present invention, there is provided a bearing assembly for a rotatable shaft having first and second axially spaced annular bearing faces, comprising first and second thrust bearings each having a plurality of thrust bearing pads spaced circumferentially from one another about the thrust bearing, the pads of the first thrust bearing lying in axial opposition to the first shaft bearing face and the pads of the second thrust bearing lying in axial opposition to the second shaft bearing face. Means are provided defining first and second cavities about the first and second thrust bearings, respectively. Means are carried by the first thrust bearing disposed between adjacent first and second circumferentially spaced thrust bearing pads thereof for directing lubricant flowing between the first thrust bearing pad and the first shaft bearing face for flow in a generally tangential direction into the first cavity and for directing lubricant from adjacent the shaft between the second thrust bearing pad and the first shaft bearing face. Means are also carried by the second thrust bearing disposed between adjacent first and second circumferentially spaced thrust bearing pads thereof for directing lubricant flowing between the first thrust bearing pad and the second shaft bearing face for flow in a generally tangential direction into the second cavity and for directing lubricant from adjacent the shaft between the second thrust bearing pad and the second shaft bearing face. The first and second thrust bearings and the respective directing means carried thereby are arranged to accommodate rotation of the shaft in one direction as well as in the opposite rotational direction of the shaft upon reversing the locations of the first and second thrust bearings with respect to the first and second shaft bearing faces.

Accordingly, it is a primary object of the present invention to provide a novel and improved shaft end bearing affording (i) a compact bearing pedestal design having improved rotor dynamic characteristics and bearing stability; (ii) a capacity to handle thrust loads in either axial direction; (iii) improved hydrostatic lift provisions minimizing shaft breakaway torque; (iv) bearing usage for shafts that rotate in either direction; and (v) minimal or no lubricant leakage through bearing end seal assemblies.

BRIEF DESCRIPTION OF DRAWINGS

FIG. 4 is an end elevational view of an end seal element forming part of a lubricant deflector;

FIG. 5 is a cross-sectional view thereof taken generally about on line 5—5 in FIG. 4;

BEST MODE FOR CARRYING OUT THE INVENTION

Reference will now be made in detail to a present preferred embodiment of the invention, an example of which is illustrated in the accompanying drawings.

Figure 1:
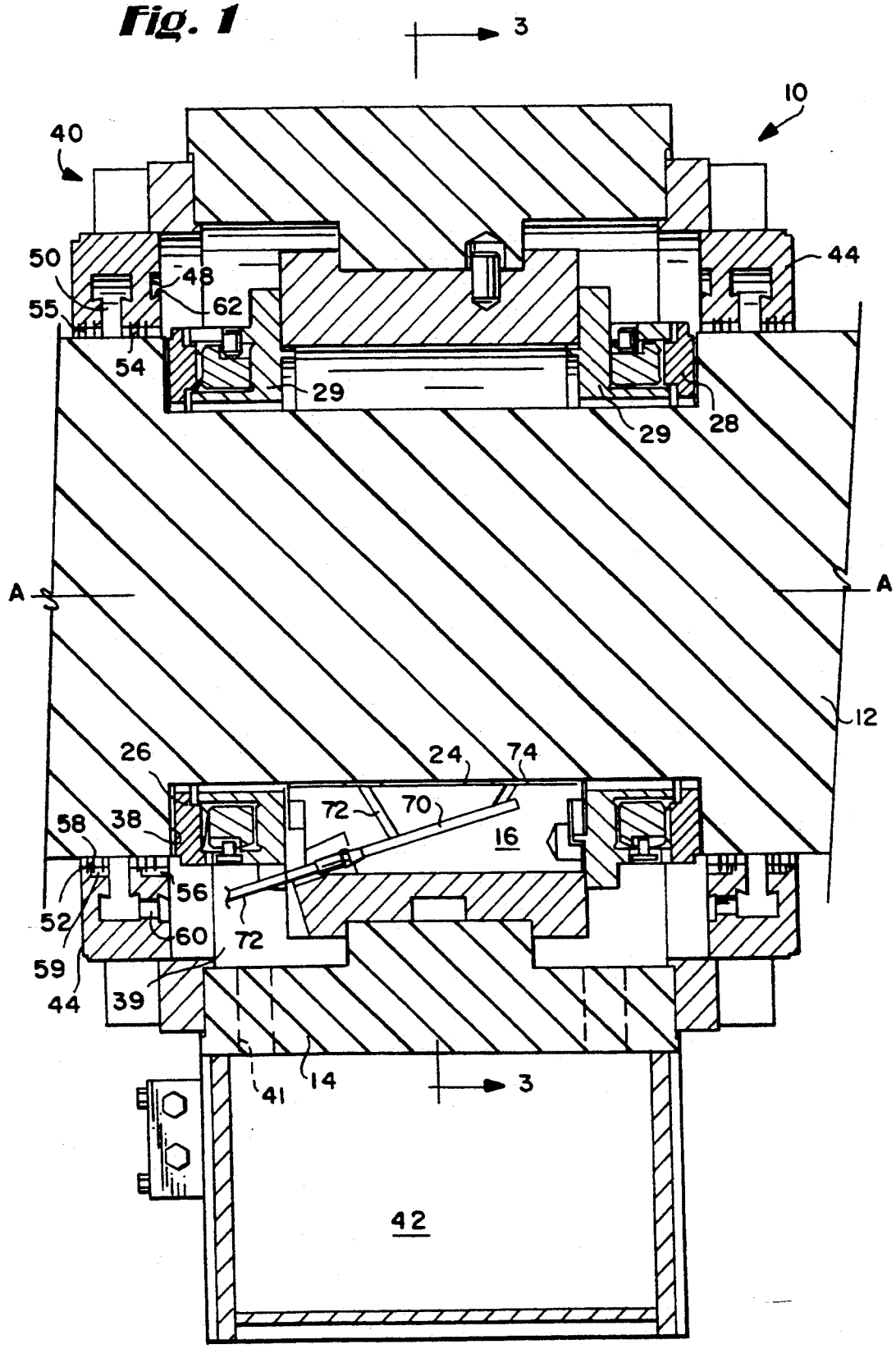
FIG. 1 is a cross-sectional view through a shaft bearing pedestal having journal and thrust bearings and end seal assemblies in accordance with the present invention.
Figure 3:
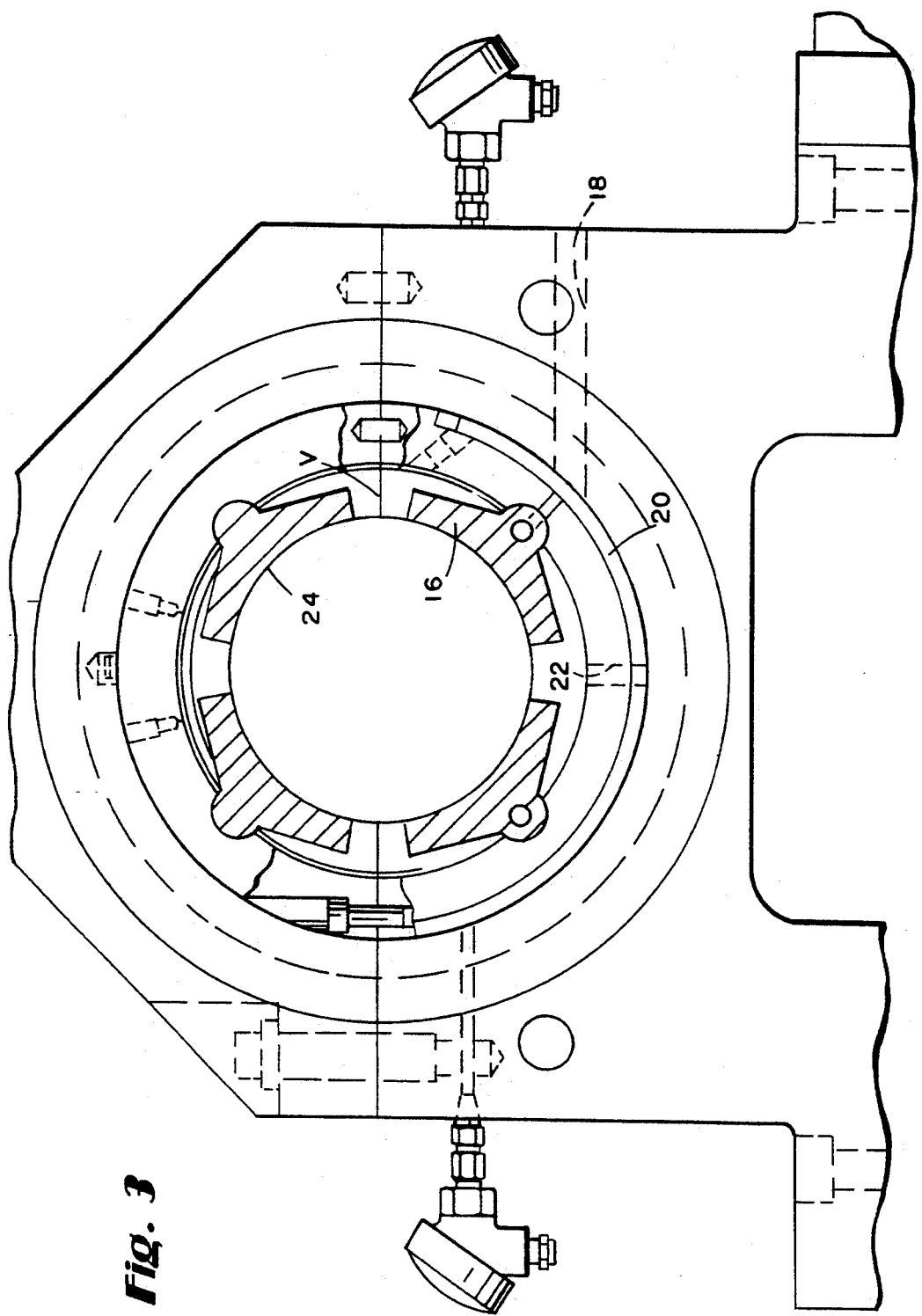
FIG. 3 is a cross-sectional view taken generally about on line 3—3 in FIG. 1.

Referring now to the drawings, particularly to FIG. 1, there is illustrated a bearing pedestal constructed in accordance with the present invention and generally designated 10. Pedestal 10 supports shaft 12 for rotation about an axis A—A. Pedestal 10 includes an annular supporting structure 14 which in turn supports a plurality of journal bearings 16, preferably four double-tilt bearing pads. Preferably, each pad is preloaded to have a machined pad diameter larger than the assembled diameter of the bearing to afford specific rotor-dynamic characteristics required by the rotating system, for example, a generator. While four pads are preferred, different numbers of pads can be provided. An oil or lubricant inlet line 18 (FIG. 3) is provided for feeding an arcuate chamber 20 communicating with the volume V surrounding the pads 16 by way of lubricant inlet ports 22. Thus, lubricant can be flooded in and about the pads and between shaft 12 and pad surfaces 24.

Figure 2:
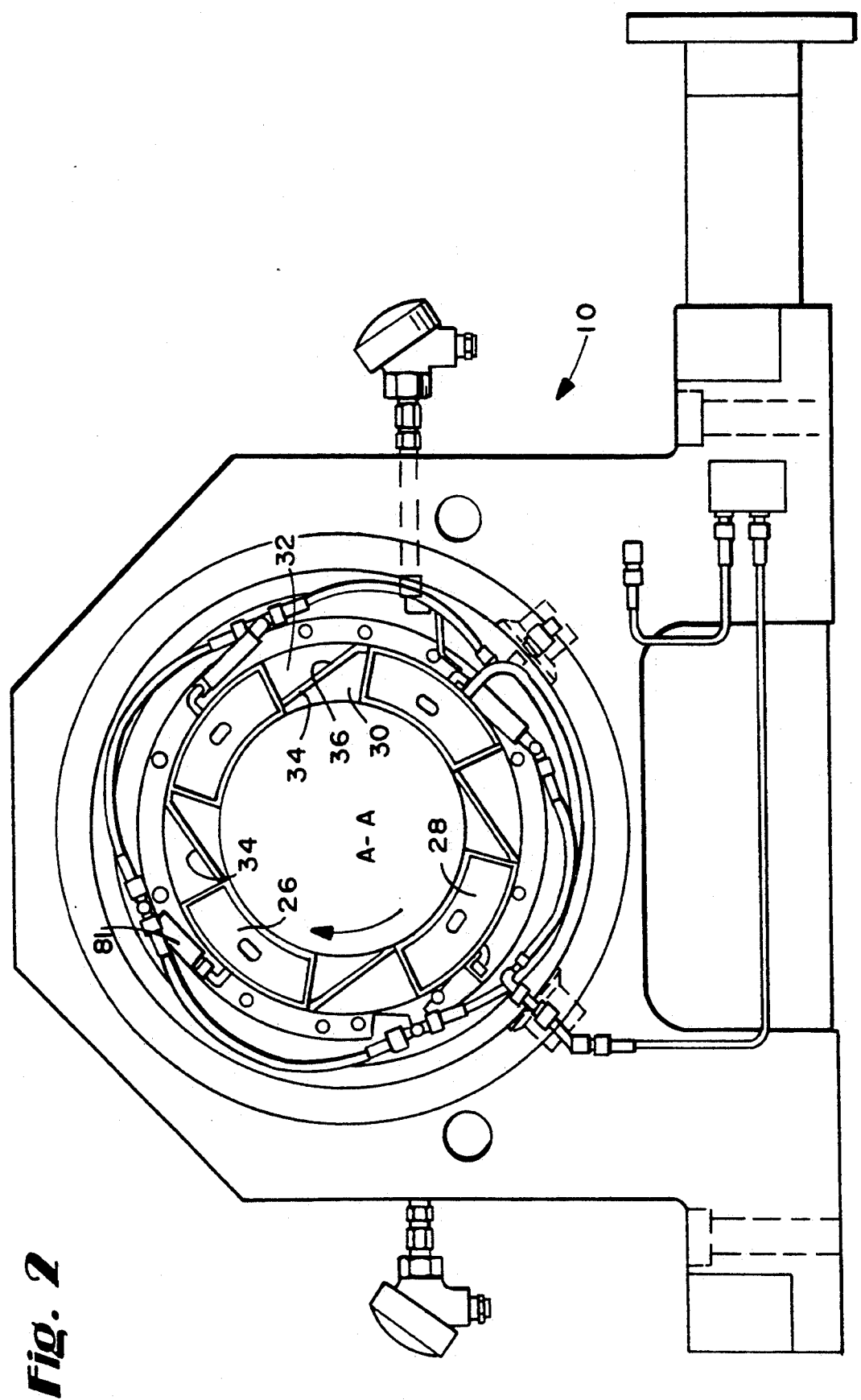
FIG. 2 is an end elevational view of the thrust bearings in the bearing pedestal with the shaft removed to illustrate the end faces of a thrust bearing and portions of the pedestal.

Secured to the bearing are two self-equalizing thrust bearings 26. The bearings are substantially identical to one another with certain parts reversed in configuration to accommodate a predetermined direction of rotation of the shaft when placed at opposite sides of the pedestal bearing. As best illustrated in FIG. 2, each thrust bearing 26 comprises four thrust bearing pads 28 spaced circumferentially one from the other about the axis of rotation of shaft 12. The pads are mounted for pivotal movement about normally related axes to enable loads applied to the thrust bearing to be equally distributed to each of the pads 28. The thrust pads are backed by a retainer 29 as illustrated in FIG. 1.

Figure 7:
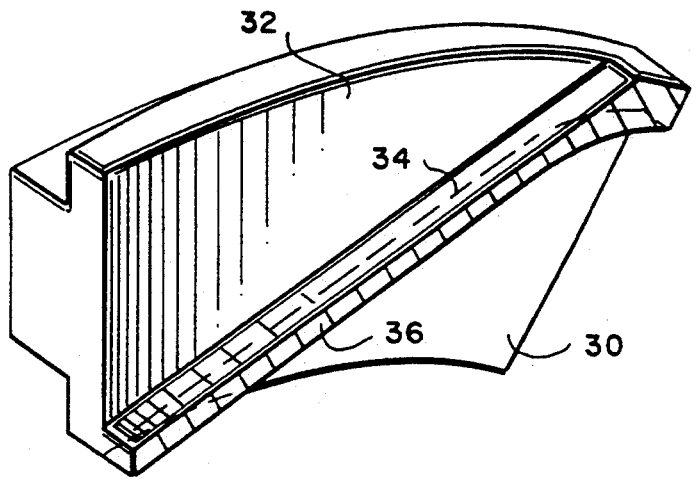
FIG. 7 is a perspective view of a lubricant director pad forming part of the thrust bearing hereof.

For purposes which will become clear, lubricant director pads 30 are disposed between each of the circumferentially next adjacent pair of pads 28. As best seen in FIGS. 2 and 7, lubricant director pad 30 has an end face 32 and a rib 34 which projects axially from end face 32. As seen in FIG. 2, rib 34 extends from one end of director pad 30 adjacent a radially innermost end thereof and adjacent shaft 12 to a radially outermost position at the opposite end of the director pad and adjacent the outer periphery of the pad. The end face 36 of rib 34 is set back slightly from the end faces 37 of the thrust bearing pads 28. Rib 34, as seen in FIG. 2, thus extends substantially tangentially of shaft 12 and in the direction of rotation of shaft 12 indicated by the arrow in FIG. 2. Also as seen in FIG. 2, ribs 34 on each of the director pads 30 extend tangentially in like circumferential directions, i.e., in the direction of the rotation of shaft 12. As best illustrated in FIG. 1, there is defined a pair of cavities 39 extending annularly about the thrust bearings 28, respectively, for receiving lubricant from the thrust bearing assemblies 26 and passing that lubricant via passages 41 into a sump 42.

Figure 8:
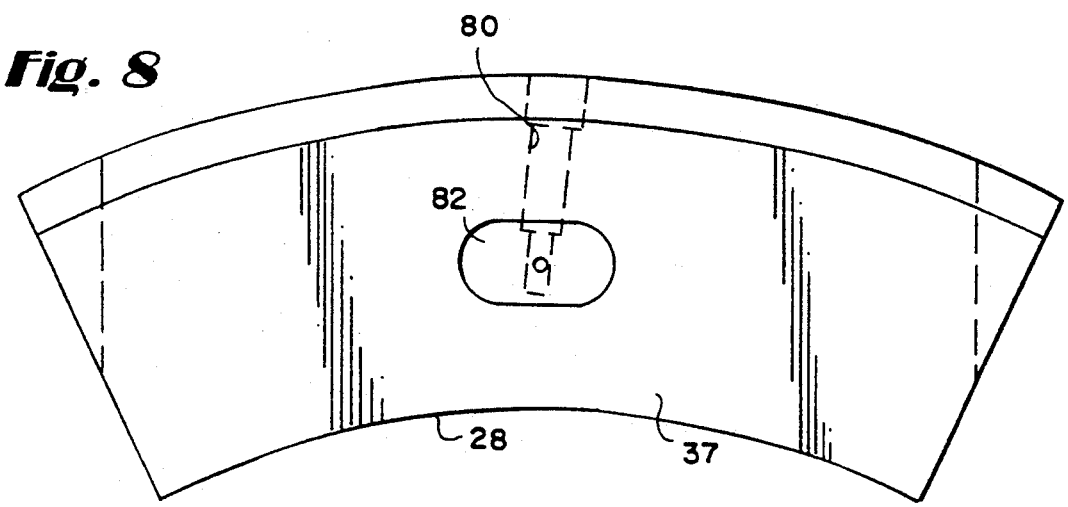
FIG. 8 is an end elevational view of a thrust pad illustrating the hydrostatic lift recess in its face.

An end seal assembly is disposed adjacent each of the thrust bearings 26 axially outwardly of the thrust bearing faces 38 of shaft 12 which lie in opposition to the thrust bearing faces 37 (FIG. 8). These end seal assemblies, generally designated 40, in conjunction with the lubricant director pads as explained below, substantially preclude leakage of lubricant out of the pedestal assembly. End seal assembly 40 includes internal and external labyrinth seals 54 and 55, respectively, each mounted on a ring element 44 extending about shaft 12. Element 44 also carries an additional lubricant-catching gutter 48 and a lubricant-catching groove 50, the entire assembly being designated a lubricant deflector. The internal and external labyrinth seals each include a plurality of knife edges 52 secured to the annular element 44 at spaced axial positions from one another. The internal labyrinth seal 54 also includes a plurality of drain back openings 56 spaced from one another along the lower side of element 44 for receiving lubricant deflected from shaft 12 by the knife edges 52 of the internal seal 54 and directing that lubricant to cavity 39. Between the internal and external labyrinth seals 54 and 55, there is provided an annular catcher groove 50 having an annular opening adjacent the shaft surface and between the axially spaced internal and external labyrinth seals 54 and 55. Groove 50 communicates with cavity 39 through a borehole 60 adjacent its lower end. As illustrated in FIG. 1, annular gutter 48 comprises an annular groove formed in the inside face of element 44 and which has a radially inner wall or edge 62 which is angled. Thus, gutter 48 may receive lubricant splashed into cavity 39 by the lubricated directors and the angled wall 62 maintains the lubricant within groove 48 for flow about the groove and into the cavity 39 at the bottom of the end seal assembly.

Figure 6:
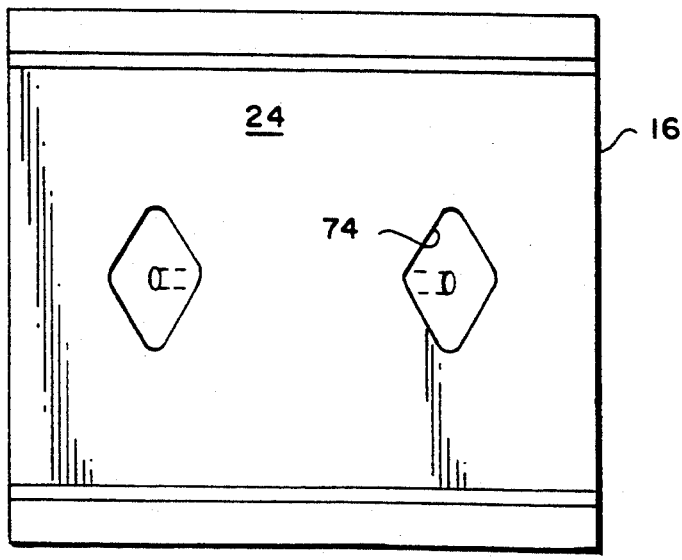
FIG. 6 is an elevational view of a journal pad surface illustrating the recesses forming part of a hydrostatic lift mechanism.

The journal and thrust bearing pads are provided with hydrostatic lift features to facilitate initial rotation of the shaft, e.g., at generator start-up and avoid metal-to-metal contact at start-up. With reference to FIGS. 1 and 6, the journal bearing pads 16 along the lower side of the journal housing are each provided with a lubricant passage 70 for receiving high pressure lubricant through a flexible hose 72 coupled to passage 70. The passage 70 has two branches 72 for communicating the high pressure lubricant to recesses 74 formed in the bearing pad surface 24 and on opposite sides of the longitudinal pivotal axis of the bearing pad. Consequently, when the rotor shaft is at rest and the lubricant has been squeezed out between the shaft and the journal bearing surfaces, there is typically substantial metal-to-metal contact. The shaft breakaway torque is thus very substantial. In order to achieve shaft breakaway at minimal torque, high pressure lubricant is supplied through passages 70 and branch passages 72 into recesses 74 to lift the generator shaft away from each of the journal bearing surfaces. When lifted, the lubricant forms an oil film between the journal bearing pad surfaces and the shaft and the shaft can be rotated with minimum breakaway torque.

Similarly, thrust bearing pads 28 each have a high pressure lubricant passage 80 for receiving lubricant from a high pressure pump. The metering orifice 81 (see FIG. 2) controls flow to the lubricant passage 80 which terminates at a recess 82 formed in the end surface of the thrust bearing pad. Thus, at start-up, high pressure lubricant is supplied through the passages 80 into recesses 82 to create a gap between each shaft thrust bearing face 38 and the faces 24 of the thrust pads, enabling lubricant to flow into that gap forming an oil film. Each of the lubricant flow passages in the journal bearing pads and the thrust bearing pads contains a check valve enabling the lubricant to be supplied to the recesses on the pad surfaces, and preventing pressurized lubricant from flowing from the pad surface back into the lubricant supply system.

In operation after start-up, lubricant is supplied to the arcuate chamber 20 which, in turn, supplies lubricant in and about the journal bearings and their bearing surfaces. The lubricant is metered to the journal bearings and thus the journal bearing pads are flooded with lubricant. With the shaft rotating, lubricant passes axially along the journal bearing surfaces and the shaft to locations between the shaft and the internal diameter of the thrust bearing retainer 29. From there, the lubricant migrates radially outwardly to the inside diameter of the shaft thrust faces and the surfaces of the thrust bearing pads. With reference to FIG. 2, it will be seen that the lubricant is then channeled by rib 34 from adjacent the shaft and a preceding thrust bearing pad (in the direction of shaft rotation) to the leading edge of the next circumferentially adjacent thrust bearing pad (in the direction of shaft rotation). Simultaneously, lubricant received along the leading edge of the lubricant director pad 30 is channeled by rib 34 in a direction generally tangentially of the shaft surface and in the direction of its rotation for radial outward flow out of the thrust bearing assembly into the cavity 39. The thrust bearings thus operate in a controlled directed lubricated condition without requiring a flooded cavity, i.e., the bearing design hereof maintains a flooding of lubricant in the journal bearing, yet allows the thrust bearing to be non-flooded. By utilizing the lubricant in this manner, only approximately half the quantity of lubricant that would otherwise be required is used. The arrangement of the lubricant directors minimizes the availability of lubricant for leakage past the end seal assembly. That is, by directing the lubricant flow tangentially and radially outwardly of the thrust bearings, only a minimum amount of lubricant is available for flow into the end seal assembly. In short, a minimum quantity of lubricant impinges on the shaft at the location of the lubricant deflector end seal assembly. Instead, the majority of the lubricant flows directly into the pedestal cavity 39 and into the lubricant sump 42.

It will be appreciated that a portion of the lubricant being directed radially and tangentially into cavity 39 will splash against the end face of end seal assembly element 44. To preclude such splashed lubricant from leaking past the end seal assembly, the splashed lubricant is collected in the annular gutter 48, and retained therein by the angled surface 62 for flow about gutter 48 toward the bottom of the bearing pedestal, where it empties into the cavity 39 for flow into sump 42 via openings 41. Any leakage lubricant which does migrate on the surface of shaft 12 axially beyond the thrust bearings is deflected by the knife edges of the internal labyrinth seal 54 for flow into the drain back openings 56 which direct such flow into cavity 39. Any lubricant migrating past internal labyrinth seal 54 and along the shaft surface is also collected in the annular groove 50 between the internal and external labyrinth seals for flow to the bottom of groove 50 and through opening 60 into cavity 39. Any additional leakage flow past the internal seal 54 and groove 50, is deflected by the external labyrinth seals 55 for flow into the drain back openings 59 and into groove 50. The lubricant in groove 50 returns to the cavity 39 via the drain back opening 60.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A bearing assembly for a rotatable shaft having annular and cylindrical bearing faces, comprising:
   journal and thrust bearings, said thrust bearing including a pad for disposition in opposition to the annular shaft bearing face;
   means defining a cavity about said thrust bearing;
   means forming part of said thrust bearing for directing lubricant from adjacent the shaft between said thrust bearing pad and the shaft bearing face into said cavity;
   an end seal assembly including an element carrying a labyrinth seal surrounding the shaft at a location spaced axially of the shaft bearing face and on the side thereof remote from said thrust bearing for deflecting lubricant migrating along the shaft past the thrust bearing, said element having a recess for receiving the deflected lubricant from the labyrinth seal and opening into said cavity for flowing the deflected lubricant into the cavity; and
   said element having a lubricant catcher groove spaced axially from said labyrinth seal on the side thereof remote from the shaft bearing face, said groove opening along said shaft, said element having an opening in communication with said groove and said cavity for flowing into said cavity lubricant leaking along the shaft past said labyrinth seal and into said groove.

2. A bearing assembly according to claim 1 wherein said directing means is configured for directing lubricant from adjacent said shaft in generally radial and circumferential directions.

3. A bearing assembly according to claim 1 including an outer labyrinth seal carried by said element at a location spaced axially from the first-mentioned labyrinth seal for deflecting lubricant migrating along the shaft past said first labyrinth seal and said groove opening, at least one drain back opening in communication with said groove for receiving lubricant deflected by said outer labyrinth seal for flow into said groove.

4. A bearing assembly according to claim 1 wherein said thrust bearing includes a plurality of pads circumferentially spaced one from another, and means disposed between adjacent first and second circumferentially spaced thrust bearing pads for directing lubricant flowing between said first thrust bearing pad and the shaft bearing face for flow in a generally tangential direction into said cavity and for directing lubricant from adjacent the shaft between said second thrust bearing pad and the shaft bearing face.

5. A bearing assembly according to claim 4 wherein said directing means includes a director pad disposed between said first and second thrust bearing pads and in opposition to the shaft bearing face, said director pad including a rib projecting from said director face in an axial direction toward the shaft bearing face and extending in a direction generally tangentially of the shaft.

6. A bearing assembly according to claim 5 wherein said first and second thrust bearing pads and said director pad each have a face in axial opposition to the shaft bearing face, said rib having an axial end face spaced axially further from the shaft bearing face than the faces of the first and second thrust bearing pads are spaced from the shaft bearing face.

7. A bearing assembly according to claim 4 wherein said thrust bearing pads have faces in axial opposition to the shaft bearing face, one of said thrust bearing pads including a recess opening through the face thereof, and means in communication with said recess for supplying a lubricant to said recess under high pressure for forcing the lubricant between the face of the one pad and the shaft bearing face to axially displace the shaft bearing face and the face of said one relative to one another.

8. A bearing assembly according to claim 1 wherein said journal bearing includes a plurality of journal pads spaced circumferentially from one another about the shaft with each pad having a face in radial opposition to the shaft, one of said journal pads including a recess opening through a face thereof and means in communication with said recess for supplying a lubricant to said recess under high pressure for forcing the lubricant between the face of said one pad and the shaft to radially displace the shaft and the one pad relative to one another.

9. A bearing assembly according to claim 1 wherein said element has a generally annular face exposed to said cavity, said annular face of said element having a recess for channeling lubricant received from said cavity back into said cavity.

10. A bearing assembly according to claim 1 including an outer labyrinth seal carried by said element at a location spaced axially from the first-mentioned labyrinth seal for deflecting lubricant migrating along the shaft past said first labyrinth seal and said groove opening, at least one drain back opening in communication with said groove for receiving lubricant deflected by said outer labyrinth seal for flow into said groove, said thrust bearing including a plurality of pads circumferentially spaced one from another, and means disposed between adjacent first and second circumferentially spaced thrust bearing pads for directing lubricant flowing between said first thrust bearing pad and the shaft bearing face for flow in a generally tangential direction into said cavity and for directing lubricant from adjacent the shaft between said second thrust bearing pad and the shaft bearing face.

11. A bearing assembly according to claim 10 wherein said directing means includes a director pad disposed between said first and second thrust bearing pads and in opposition to the shaft bearing face, said director pad including a rib projecting from said director face in an axial direction toward the shaft bearing face and extending in a direction generally tangentially of the shaft, said thrust bearing pads having faces in axial opposition to the shaft bearing face, one of said thrust bearing pads including a recess opening through the face thereof, and means in communication with said recess for supplying a lubricant to said recess under high pressure for forcing the lubricant between the face of the one pad and the shaft bearing face to axially displace the shaft bearing face and the face of said one relative to one another.

12. A bearing assembly according to claim 11 wherein said element has a generally annular face exposed to said cavity, said annular face of said element having a recess for channeling lubricant received from said cavity back into said cavity.

13. A bearing assembly according to claim 10 wherein said directing means includes a director pad disposed between said first and second thrust bearing pads and in opposition to the shaft bearing face, said director pad including a rib projecting from said director face in an axial direction toward the shaft bearing face and extending in a direction generally tangentially of the shaft, said journal bearing including a plurality of journal pads spaced circumferentially from one another about the shaft with each pad having a face in radial opposition to the shaft, one of said journal pads including a recess opening through a face thereof and means in communication with said recess for supplying a lubricant to said recess under high pressure for forcing the lubricant between the face of said one pad and the shaft to radially displace the shaft and the one pad relative to one another.

14. A bearing assembly according to claim 13 wherein said element has a generally annular face exposed to said cavity, said annular face of said element having a recess for channeling lubricant received from said cavity back into said cavity.

15. A bearing assembly for a rotatable shaft having an annular bearing face, comprising:
at least one thrust bearing having a plurality of thrust bearing pads spaced circumferentially from one another about the thrust bearing for disposition in axial opposition to the shaft bearing face;
means defining a cavity about said thrust bearing; and means disposed between adjacent first and second circumferentially spaced thrust bearing pads for directing lubricant flowing between said first thrust bearing pad and the shaft bearing face for flow in a generally tangential direction into said cavity and for directing lubricant from adjacent said shaft between said second thrust bearing pad and the shaft bearing face.

16. A bearing assembly according to claim 15 wherein said directing means includes a director pad disposed between said first and second thrust bearing pads and in opposition to the shaft bearing face, said director pad including a rib projecting from said director face in an axial direction toward the shaft bearing face and extending in a direction generally tangentially of the shaft.

17. A bearing assembly according to claim 16 wherein said first and second thrust bearing pads and said director pad each have a face in axial opposition to the shaft bearing face, said rib having an axial end face spaced axially further from the shaft bearing face than the faces of the first and second thrust bearing pads are spaced from the shaft bearing face.

18. A bearing assembly according to claim 16 wherein said thrust bearing pads have faces in axial opposition to the shaft bearing face, one of said thrust bearing pads including a recess opening through the face thereof, and means in communication with said recess for supplying a lubricant to said recess under high pressure for forcing the lubricant between the face of the one pad and the shaft bearing face to axially displace the shaft bearing face and the one pad face relative to one another.

19. A bearing assembly according to claim 16 including a journal bearing, wherein said journal bearing includes a plurality of journal pads spaced circumferentially from one another about the shaft with each pad having a face in radial opposition to the shaft, one of said journal pads including a recess opening through a face thereof and means in communication with said recess for supplying a lubricant to said recess under high pressure for forcing the lubricant between the face of said one pad and the shaft to radially displace the shaft and the one pad relative to one another.

20. A bearing assembly for a rotatable shaft having first and second axially spaced annular bearing faces, comprising:

first and second thrust bearings each having a plurality of thrust bearing pads spaced circumferentially from one another about the thrust bearing, the pads of said first thrust bearing lying in axial opposition to the first shaft bearing face, the pads of said second thrust bearing lying in axial opposition to the second shaft bearing face;

means defining first and second cavities about said first and second thrust bearings, respectively;

means carried by said first thrust bearing disposed between adjacent first and second circumferentially spaced thrust bearing pads thereof for directing lubricant flowing between said first thrust bearing pad and the first shaft bearing face for flow in a generally tangential direction into said first cavity and for directing lubricant from adjacent said shaft between said second thrust bearing pad and the first shaft bearing face;

means carried by said second thrust bearing disposed between adjacent first and second circumferentially spaced thrust bearing pads thereof for directing lubricant flowing between said first thrust bearing pad and the second shaft bearing face for flow in a generally tangential direction into said second cavity and for directing lubricant from adjacent said shaft between said second thrust bearing pad and the second shaft bearing face;

said first and second thrust bearings and the respective directing means carried thereby being arranged to accommodate rotation of the shaft in one direction and in the opposite rotational direction upon reversing the locations of said first and second thrust bearings with respect to the first and second shaft bearing faces.

* * * * *

UNITED STATES PATENT AND TRADEMARK OFFICE
CERTIFICATE OF CORRECTION

PATENT NO.  : 5,271,676

DATED       : December 21, 1993

INVENTOR(S) : Richard K. Keck et al.

It is certified that error appears in the above-identified patent and that said Letters Patent is hereby corrected as shown below:

Title Page:
Item [75] Iventors , add the following to the list of inventors:
  --; Gary Wegner, Grafton, Wisconsin.--

Signed and Sealed this

Twenty-eighth Day of June, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,271,676
DATED : December 21, 1993
INVENTOR(S) : Richard K. Keck, et al.

It is certified that error appears in the above-indentified patent and that said Letters Patent is hereby corrected as shown below:

Title page, insert: [73], revise the assignee information as follows: --General Electric Co., Schenectady, N.Y. and Orion Corporation, Grafton, Wis.--.

Signed and Sealed this

Fourteenth Day of May, 1996

Attest:

BRUCE LEHMAN

*Attesting Officer*   *Commissioner of Patents and Trademarks*